(12) United States Patent
Tomomatsu

(10) Patent No.: US 6,839,461 B2
(45) Date of Patent: Jan. 4, 2005

(54) METHOD AND APPARATUS FOR PROCESSING AN IMAGE, AND STORAGE MEDIUM

(75) Inventor: Yoshiaki Tomomatsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 702 days.

(21) Appl. No.: 09/789,627

(22) Filed: Feb. 22, 2001

(65) Prior Publication Data

US 2001/0036311 A1 Nov. 1, 2001

(30) Foreign Application Priority Data

Apr. 27, 2001 (JP) ........................................ 2000-127524

(51) Int. Cl.$^7$ ................................................ G06K 9/00
(52) U.S. Cl. ........................ 382/170; 382/172; 345/619
(58) Field of Search ................................. 345/419–582, 345/619–638; 382/103–107, 168–173, 224–225, 284

(56) References Cited

U.S. PATENT DOCUMENTS

| | | | | |
|---|---|---|---|---|
| 5,745,667 A | * | 4/1998 | Kawase et al. ............. 345/587 |
| 5,852,679 A | * | 12/1998 | Shimizu ...................... 382/180 |
| 6,388,663 B2 | * | 5/2002 | Hiroi ........................... 345/419 |
| 6,487,305 B2 | * | 11/2002 | Kambe et al. .............. 382/113 |
| 6,694,057 B1 | * | 2/2004 | Miller et al. ................ 382/203 |
| 6,734,854 B1 | * | 5/2004 | Shimizu ...................... 345/422 |

* cited by examiner

Primary Examiner—Jingge Wu
(74) Attorney, Agent, or Firm—Fitzpatrick, Cella, Harper & Scinto

(57) ABSTRACT

An image processing system which processes an image including a plurality of object images. Object images related to each other are detected, and are then image processed. Drawing commands indicating the respective object images are input and a determination is made as to whether the plurality of object images are related to each other, on the basis of position information managed by rectangular areas according to the respective drawing commands. Position information managed by the rectangular areas of object images which have been determined as being related to each other are combined to generate object image management information. An image processing condition is set in accordance with the object image management information. Combining of the position information is controlled such that a rectangular area associated with position information created as a result of the combining does not include a large unnecessary area.

6 Claims, 10 Drawing Sheets

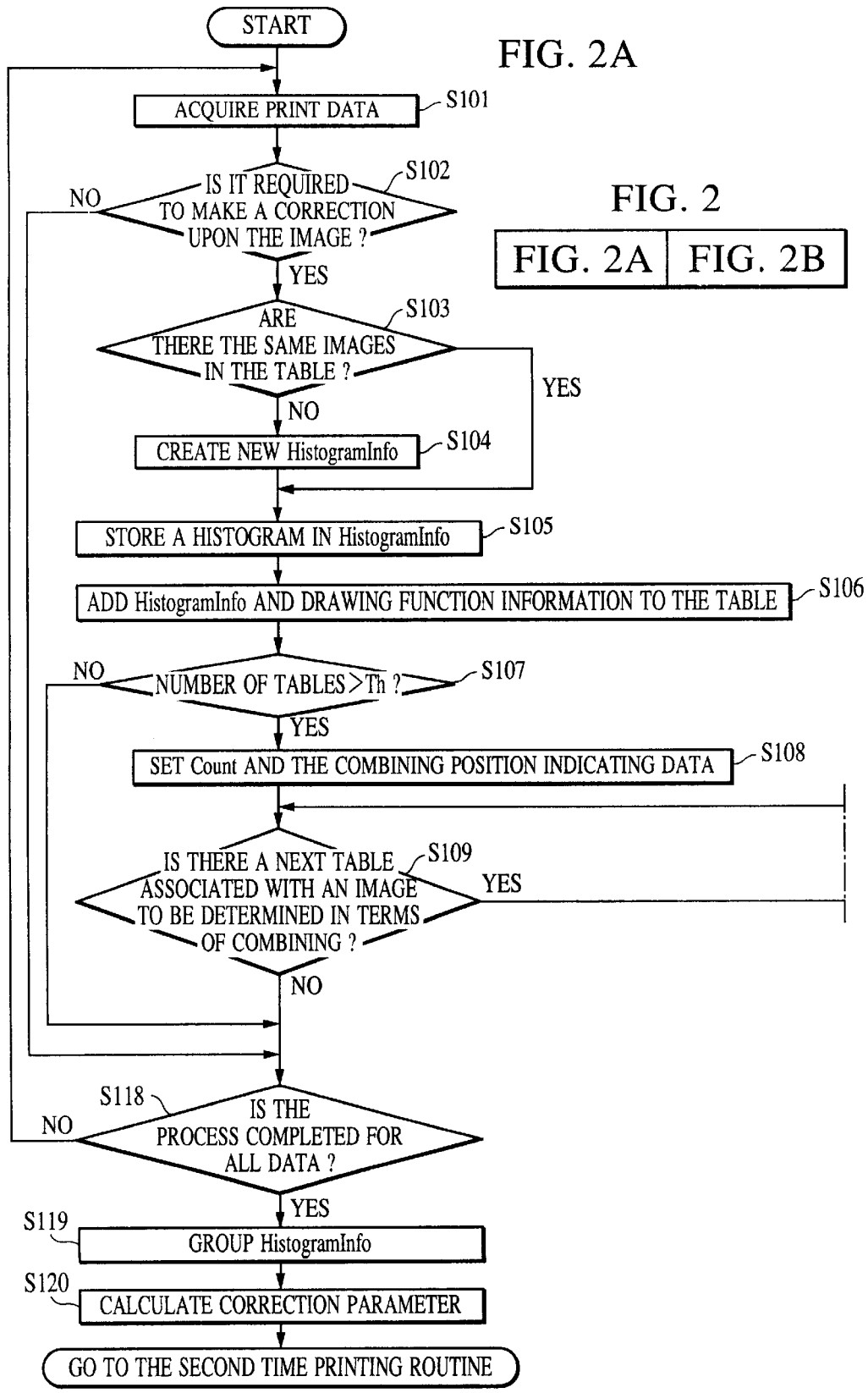

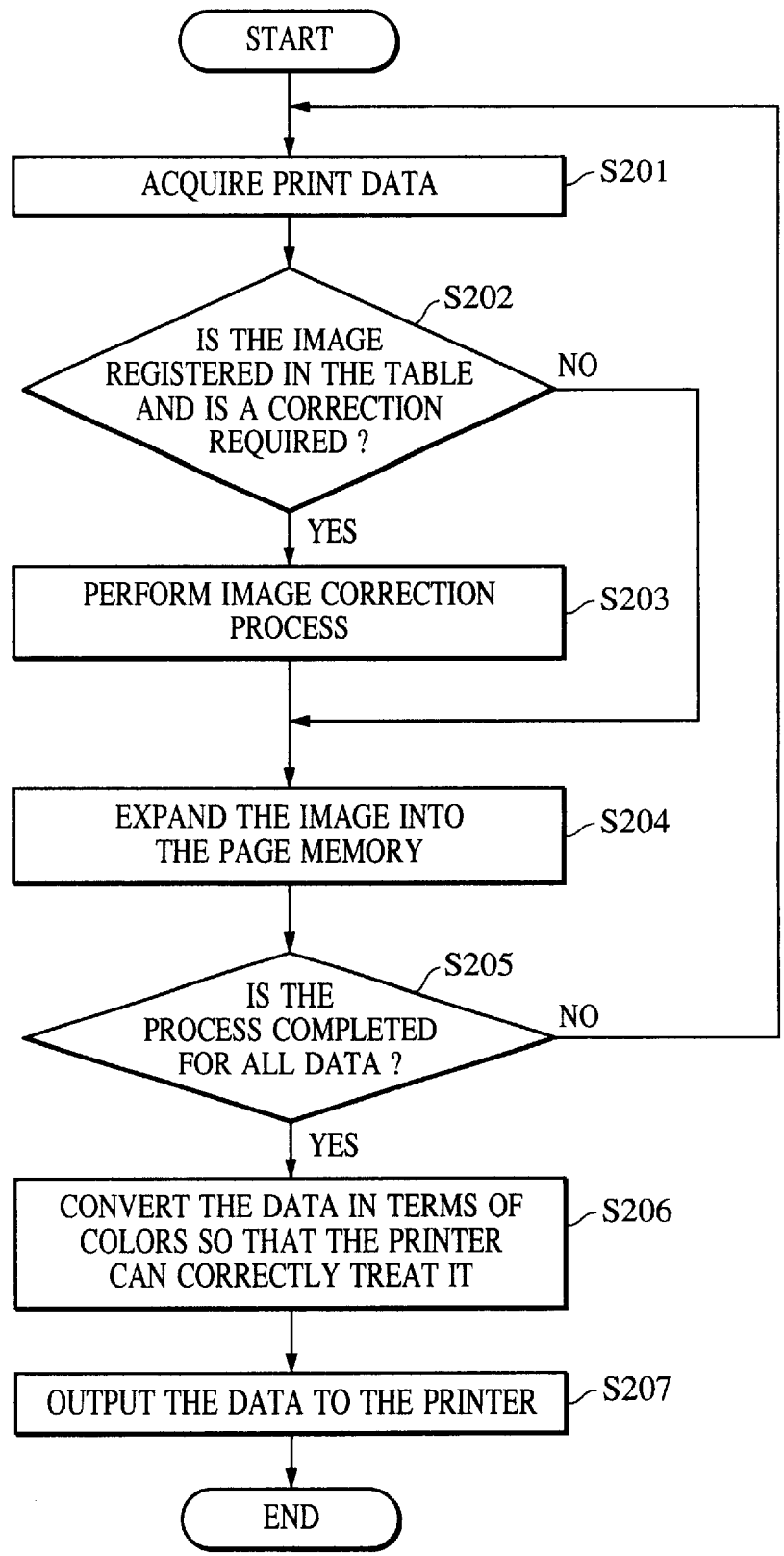

COMBINED RECTANGLE INFORMATION

ROTATED IMAGE I

COMBINED RECTANGLE INFORMATION

ROTATED IMAGE I

IMAGE II

FIG. 7

| INDEX | DRAWING FUNCTION INFORMATION | SAMPLING INFORMATION |
|---|---|---|
| 0 | VALUE OF ImageInfo | VALUE OF HistogramInfo |
| 1 | VALUE OF ImageInfo | VALUE OF HistogramInfo |
| 2 | VALUE OF ImageInfo | VALUE OF HistogramInfo |
| 3 | VALUE OF ImageInfo | VALUE OF HistogramInfo |
| : | : | : |
| m | VALUE OF ImageInfo | VALUE OF HistogramInfo |

FIG. 8

| VALUE OF ImageInfo |
|---|
| DRAWING POSITION : X |
| DRAWING POSITION : Y |
| DRAWING POSITION : W |
| DRAWING POSITION : H |

FIG. 9

| VALUE OF HistogramInfo |
|---|
| INTENSITY HISTOGRAM TABLE |
| CORRECTION NECESSITY FLAG |
| CORRECTION PARAMETER |

METHOD AND APPARATUS FOR PROCESSING AN IMAGE, AND STORAGE MEDIUM

BACKGROUND OF THE INVENTION

1. Field of the Invention

The present invention relates to a technique of detecting related objects from an input image including a plurality of object images and performing image processing in accordance with the detection result.

2. Description of the Related Art

In recent years, digital cameras and photography scanners have become very popular, and it has become easy to convert a photographic image into digital data. In particular, it has become popular to deal with a photographic image in the form of digital data on a personal computer. Photographic images in the form of digital data can be edited, copied and pasted in a desired fashion on a personal computer using various kinds of application software.

However, photographic images often have factors which can cause degradation in image quality such as a color blur, for reasons described below. For example, in the case of a digital camera, a CCD used in the digital camera can detect infrared wavelength components which are not perceptible by human eyes. Although a filter may be used to remove infrared components, the above problem cannot be completely solved. Furthermore, due to a limitation in the performance of a CPU disposed in a camera and due to real-time constraints, a satisfactory result is not always obtained in a color balance correction performed by a camera. It is known that human beings can make corrections in terms of differences in color of light sources (that is, human being can adapt to differences in color of light sources). In contrast, cameras faithfully capture differences in color of light sources. Therefore, a color blur can occur even if a camera correctly detects colors. Similar problems can also occur in photography scanners and flatbed scanners, and a satisfactory color balance is not always obtained in digital data converted from a negative or reversal film even if the negative or reversal film is ideal.

To avoid the above problems, a technique has been proposed to generate a histogram from pixel data of an original image and detect pixel data corresponding to a predetermined frequency of occurrence, whereby an image correction is performed on the basis of the detected pixel data.

In some relatively high-level applications in which memory is used in a highly efficient manner and the processing speed is optimized, an image with a large size is internally divided into plural parts and processed by a plurality of image drawing commands. In this case, information of divided image parts is analyzed to detect a plurality of drawing commands associated with the same original image, and the same color processing condition is set to the drawing commands found to be associated with the same original image. A specific example of such a technique is disclosed in U.S. patent application Ser. No. 09/336,987, filed Jun. 21, 1999, which application is assigned to the assignee of the present invention.

In this technique, detection of divided image parts originating from the same original image is performed on the basis of overlapping among image parts and also on the basis of the image information. In some applications, when an image is rotated and the resultant image is output, the image is divided into a large number of parts. In such a case, management information including coordinates associated with each drawing command can become very large. If the management information becomes too large, it becomes impossible to store information associated with all coordinates.

SUMMARY OF THE INVENTION

In view of the above, it is an object of the present invention to provide a technique of efficiently combining management information thereby making it possible to use a memory in a highly efficient fashion even for an image divided into a large number of small parts.

According to an aspect of the present invention, in order to achieve the above object, there is provided a method of processing an image including a plurality of object images, comprising the steps of detecting object images related to each other and performing image processing thereon, the method further comprising the steps of: inputting drawing commands indicating the respective object images; determining whether the plurality of object images are related to each other, on the basis of position information managed by rectangular areas according to the respective drawing commands; combining position information managed by the rectangular areas of object images which have been determined, in the determination step, as being related to each other, thereby generating object image management information; and setting an image processing condition in accordance with the object image management information, wherein the combining step is controlled such that a rectangular area associated with position information created as a result of the combining does not include a large unnecessary area.

It is another object of the present invention to achieve an increase in the processing speed by efficiently generating a histogram of a large number of divided image parts.

According to another aspect of the present invention, to achieve the above object, there is provided a method of processing an image including a plurality of object images, comprising the steps of detecting object images related to each other and performing image processing thereon, the method further comprising the steps of: inputting drawing commands indicating the respective object images; and generating object image management information including position information and histogram information for each object image, wherein if it is determined on the basis of the position information that object images are related to each other, histogram information associated with each object image is combined together and information which points to said resultant combined histogram information is described in said object image management information.

Further objects, features and advantages of the present invention will become apparent from the following description of the preferred embodiments with reference to the attached drawings.

BRIEF DESCRIPTION OF THE DRAWINGS

FIGS. 2A and 2B taken together as shown in form a flow chart illustrating a first routine of processing print data;

FIG. 3 is a flow chart illustrating a second routine of processing print data;

FIG. 7 illustrates an example of a table;

FIG. 8 illustrates examples of the values of ImageInfo;

FIG. 9 illustrates examples of the values of HistogramInfo; and

DESCRIPTION OF THE PREFERRED EMBODIMENTS

First Embodiment

Figure 1:
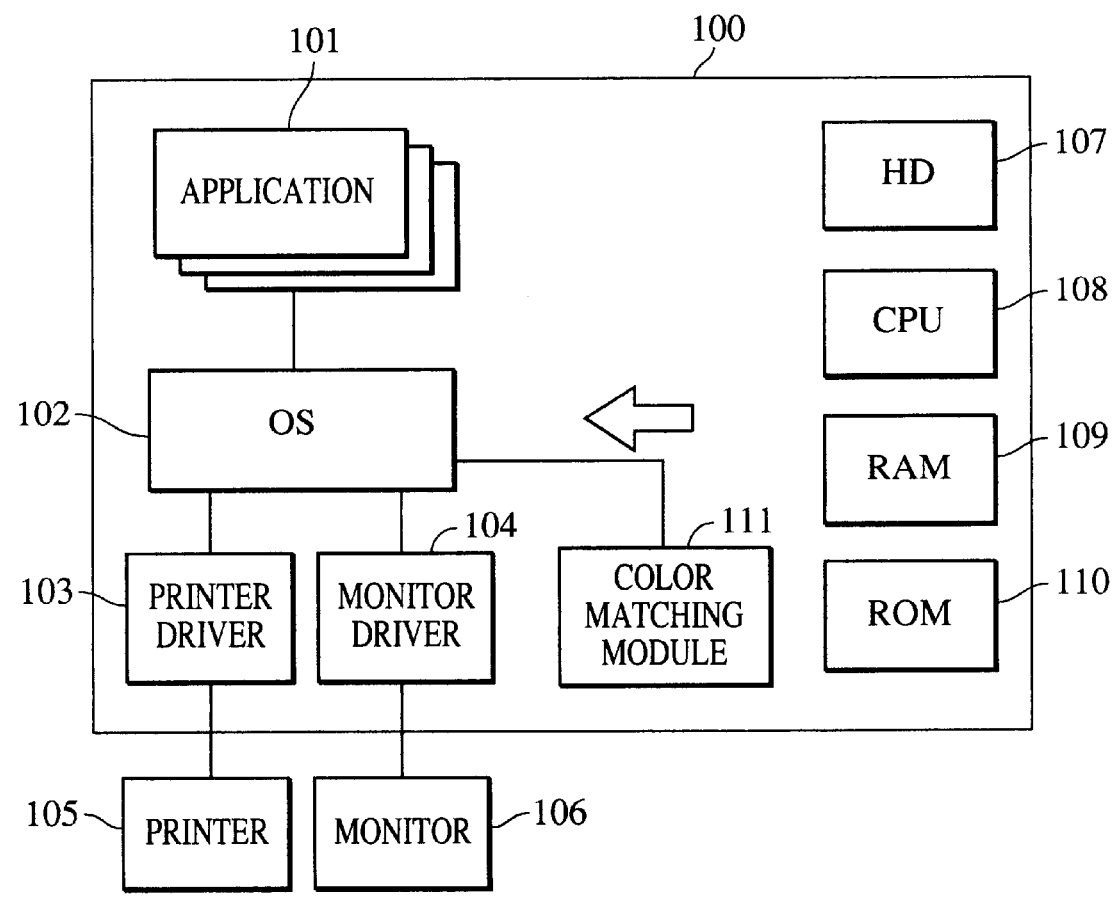
FIG. 1 is a block diagram illustrating a first embodiment of the present invention.

The present invention is described in further detail below with reference to preferred embodiments in conjunction with the accompanying drawings. FIG. 1 is a schematic diagram illustrating an embodiment of a system according to the present invention.

A printer 105 such as an ink-jet printer and a monitor 106 are connected to a host computer 100. The host computer 100 has software including application software 101 such as a word processor, a spreadsheet, or an Internet browser, a printer driver 103 for processing various drawing commands (image drawing command, text writing command, graphics drawing command), associated with an output image, issued by the application software to an OS (operating system) 102 so as to generate print data, a monitor driver 104 for processing the various drawing commands issued by the application to display image data on a monitor 106, and a color matching module 111 for performing color matching in response to a request issued by the application.

The host computer 100 has hardware for executing the software described above, including a central processing unit (CPU) 108, a hard disk (HD) driver 107, a random access memory (RAM) 109, and read only memory (ROM) 110.

In a specific example of the system shown in FIG. 1 Microsoft Windows, which is a widely used operating system, is employed as the OS of the personal computer, an arbitrary application having a printing capability is installed on the personal computer, and a monitor and a printer are connected to the personal computer.

On the host computer 100, the application 101 generates output image data which may include text data such as characters, graphics data, and/or image data such as natural image data, while displaying the image on the monitor 106. When it is desired to print the output image data, the application 101 sends to the OS 102 a print request together with a set of drawing commands associated with the output image data, wherein the set of drawing commands may include a graphics drawing command associated with graphics data and an image drawing command associated with image data. In response to the output request received from the application 101, the OS 102 issues a set of drawing commands to the printer driver 103 corresponding to the printer 105. The printer driver 103 processes the print request and the set of drawing commands received from the OS 102 and generates print data in a form printable by the printer 105. The resultant print data is transferred to the printer 105. In the case where a raster printer is used as the printer 105, the printer driver 103 rasterizes the drawing commands received from the OS into an RGB 24-bit page memory. After rasterizing all drawing commands, the printer driver 103 converts the content stored in the RGB 24-bit page memory into a data format such as a data format based on the CMYK color model which allows the printer 105 to perform printing.

The printing process performed by the printer driver 103 is described below. The printing process performed by the printer driver 103 can be generally categorized into the following five categories.

(1) Determination of the Type of Data

The types of the drawing commands associated with object images received from the OS 102 are determined thereby determining whether the object images associated with the drawing commands are photographic image parts, text parts, or graphics parts.

(2) Image Correction

A shift in color balance from an optimum state due to a photographing condition or the like is corrected. An intensity histogram of a photographic image is generated, and a nonlinear color balance correction condition is determined from the intensity histogram. A nonlinear color balance correction is then performed upon the photographic image so as to obtain a good color balance, a good contrast and good chroma saturations.

(3) Color Matching

Color matching is performed by the color matching module 111 using a source profile corresponding to input color information contained in the drawing commands and a printer profile corresponding to the printer so as to convert the input color information into printer color information which matches the printer.

(4) Rasterizing

In accordance with the color information which has been subjected to the image correction and the color matching, RGB raster data having a resolution corresponding to the resolution of the printer is generated from the drawing commands and sequentially rasterized into the RGB 24-bit page memory.

(5) Printer Color Processing

The RGB raster data is then subjected to a intensity/density conversion, a masking process, a gamma process, and a conversion into N-level data so as to convert the RGB raster data into CMYK data corresponding to CMYK color agents used by the printer.

With reference to FIGS. 2 and 3, the flow of the processes performed by the printer driver in accordance with the present embodiment are described below.

The printer driver 103 makes first and second requests to the application 101 or the OS 102 to send the print data (set of drawing commands) representing a page image to be printed. In response to both the first and second requests, the application issues a set of all drawing commands required to output a page.

Figure 2B:
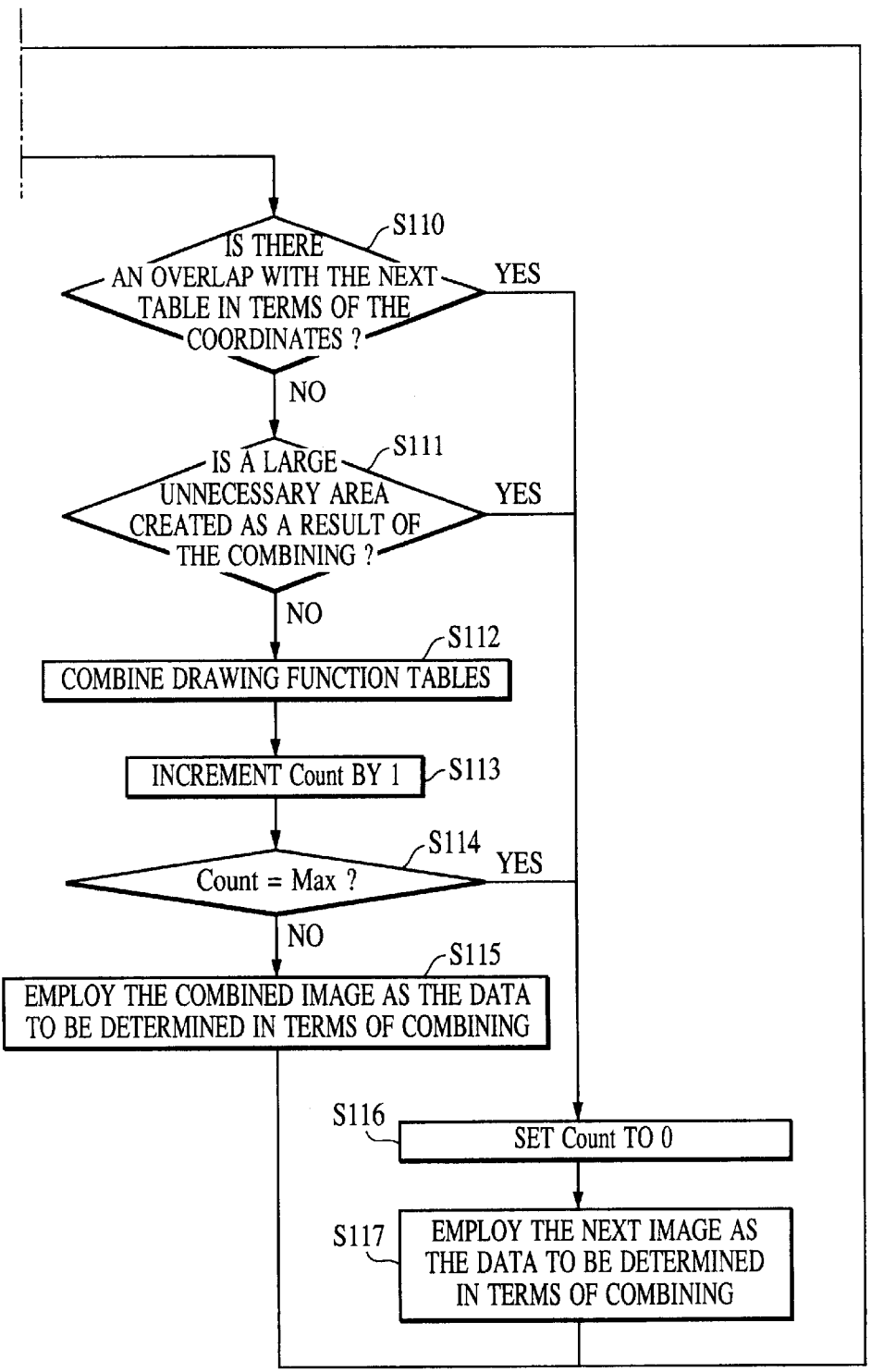

FIGS. 2A and 2B when taken together as shown in FIG. 2 illustrate a first routine of processing the print data, and FIG. 3 illustrates a second routine of processing the print data.

In the first routine of processing the print data, the print data is analyzed to acquire information required to perform the image correction thereby making preparations for the image correction. In the second routine of processing the print data, in accordance with the result of the preparation made in the first routine, the image correction is performed only for image drawing commands which have been determined as needing a correction. After that, the color matching is performed, and the resultant drawing commands are rasterized into the page memory so as to generate a print image.

In some high-level applications in which memory is used in a highly efficient manner and the processing speed is optimized, an image with a large size is often divided into plural parts and processed by a plurality of image drawing commands. In this case, image drawing commands are analyzed to detect those parts originating from the same original image on the basis of overlapping in terms of coordinates (note that parts being in contact at just borders with each other are also regarded as being overlapped with each other).

Figure 4:
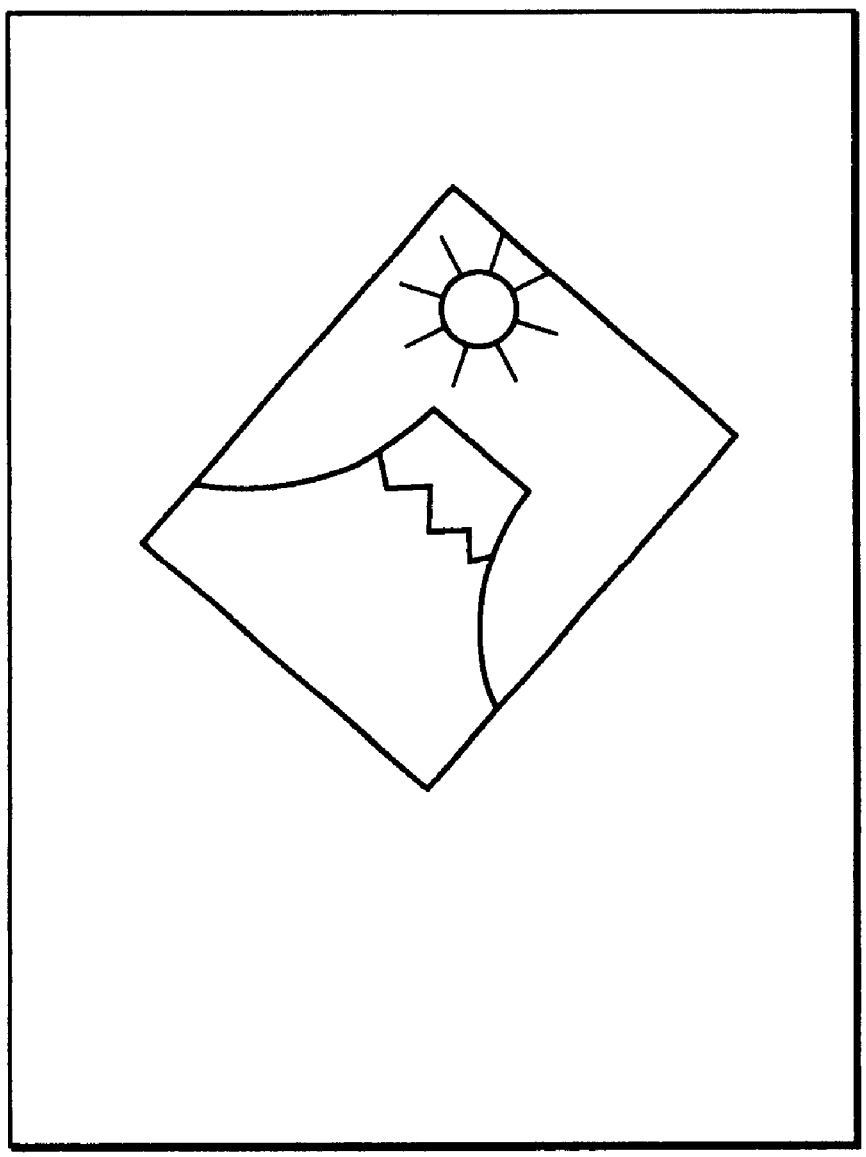
FIG. 4 is a diagram illustrating an example of a rotated image.
Figure 5:
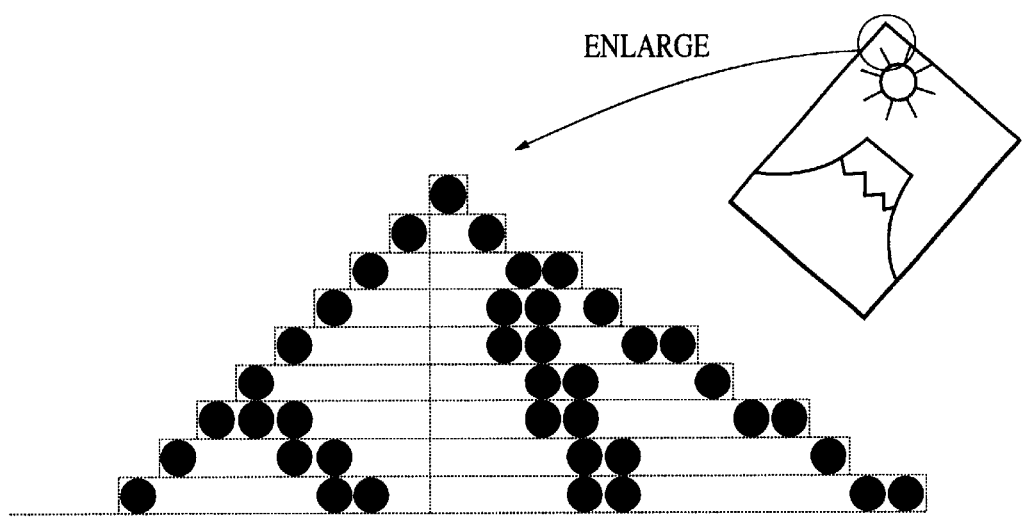
FIG. 5 is a diagram illustrating, in an enlarged fashion, a part of the image shown in FIG. 4.

In the above process, in order to determine, on the basis of the overlapping in terms of coordinates, whether image parts originate from the same image, it is required to retain the coordinates of the respective divided parts of the image. However, in some cases, for example, when a rotated image such as that shown in FIG. 4 is dealt with by some application software, the image is divided into a large number of small rectangles. FIG. 5 illustrates, in an enlarged fashion, some parts of the image shown in FIG. 4. In this example, the image is divided into parts each having a vertical width equal to one pixel. If the coordinate information of each divided part should be stored in the memory for use in the detection of overlapping, a very large memory capacity is required. Furthermore, it takes a very long time to make a correction and retrieve image information to be processed.

The above problem can be solved if image parts originating from the same image are combined together before storing the coordinate information or the like. However, because each image drawing command specifies a particular image part by a rectangular area so as to achieve an increase in the processing speed, and the rectangular area is specified by position information including coordinates, if a plurality of image parts are simply combined together, there is a possibility that image parts originating from different images are incorrectly combined together.

Figure 6A:
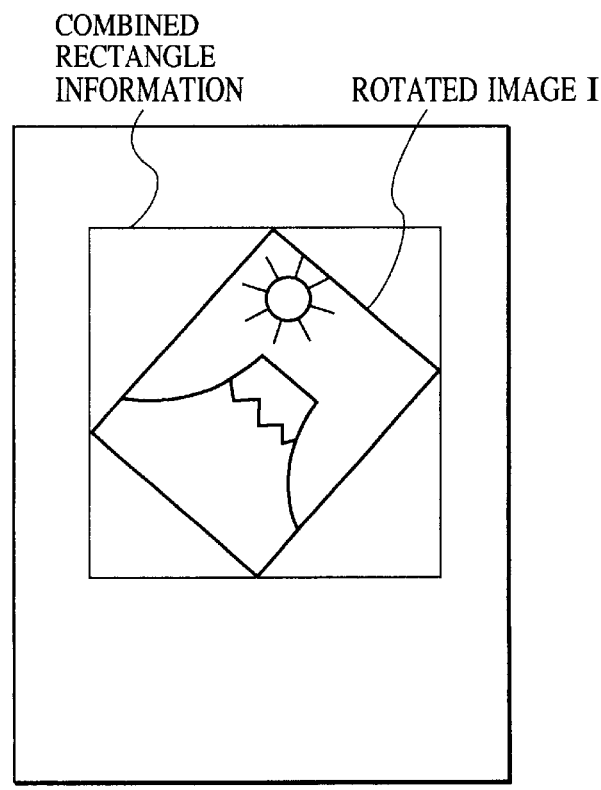
FIG. 6 is a diagram illustrating rectangle information which will be generated if all image parts related to each other are combined together.
Figure 6B:
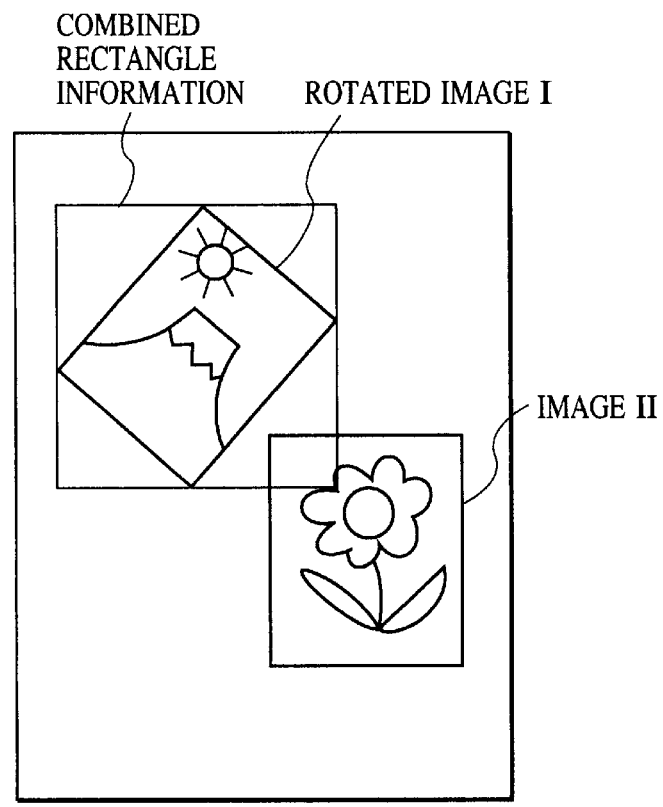

FIGS. 6A and 6B are diagrams illustrating examples of rectangular areas which will be created when plural image parts having overlaps are simply combined together. If there is only a single original image I, as shown in FIG. 6A, which may be in an even rotated state, no problem occurs. However, when there is another image II, as shown in FIG. 6B, in addition to a rotated image I, there is a possibility that there is an overlap between a corner of a combined rectangular area of the rotated image with the image II. This can cause the rotated image I and the image II to be incorrectly determined as originating from the same image, and thus can make it impossible to perform corrections optimized for the respective images.

In the present embodiment, in order to avoid the above problem, instead of combining image parts simply on the basis of overlapping, coordinate information is combined only when a particular condition is satisfied, thereby achieving an increase in efficiency of memory usage, a reduction in a non-image part included in a combined rectangular area, and prevention of incorrect combining of image parts originating from different images.

With reference to FIG. 2, the first routine of processing the print data is described below.

In step S101, drawing commands are received one by one from the application or the OS. In the next step S102, a received drawing command is analyzed to determine whether the image should be subjected to a correction. In the case where the drawing command is a text or graphics command and is not an image drawing command, the object image is determined as being not of the photographic image type, and the process goes to step S118 without performing any steps in the first routine. Even when the drawing command is an image drawing command, if it is determined that the image is not to be corrected, the process also goes to step S118. In this specific embodiment, the image correction process is performed to correct a shift from an optimum color balance caused by a condition under which an image was taken. That is, in the present embodiment, the image correction process is performed when the image of a photographic image. In most cases, photographic images are RGB object images represented in 24-bit or more levels. When a given image is represented in a smaller number of bit levels (for example, 8-bit levels), the image can be regarded as not being a photographic image. In this case, it is determined that the image is not to be subjected to the image correction process.

In step S103, an entry for storing object management information is created in a drawing function information table in a RAM, as shown in FIG. 7. Image parts having overlaps with the image to be processed are retrieved on the basis of the drawing function information associated with the image to be processed and ImageInfo described in the table. In the present embodiment, the overlapping between image parts is detected from the coordinated information. In most cases, the divided image parts are output in the order of a correct succession. Therefore, the retrieval is performed starting from an entry which has been registered last. In the present embodiment, to prevent it from taking a long time to perform step S103, the retrieval is performed for a predetermined finite number of entries.

FIG. 8 illustrates an example of the content of drawing command information ImageInfo stored in the table. In order to make it possible to determine, on the basis of only coordinates, whether the divided image parts are of the same original image, the content of ImageInfo includes a drawing position (X, Y) where the object image specified by the image drawing command is to be drawn, and the width W and the height H thereof.

In order to increase determination accuracy, the content of ImageInfo may further include color information (representing, for example, the number of colors or the color space) of the original image.

If no image parts having an overlap are found in step S103 (that is, if no image parts which are of the same original image are found), new HistogramInfo is created in step S104 and stored, in step S105, as HistogramInfo associated with the image to be processed. Examples of the values of HistogramInfo calculated in response to a drawing command are shown in FIG. 9.

On the other hand, in the case where image parts having overlaps with each other are found, the sampling values of the object image is added to HistogramInfo associated with the image part found to have the overlap, and the value of HistogramInfo of the current entry of object image is linked to the value of HistogramInfo of the image part found to have the overlap. More specifically, in the case where the values of HistogramInfo are stored in a memory area different from that in which the table is stored and data pointing to memory addresses where the values of HistogramInfo is described in the table, data pointing to the same memory address as that of the image having the overlap is described in the current entry.

Subsequently, in step S106, ImageInfo and HistogramInfo are added to, that is, described in, the entry of the drawing function information table created in step S103.

In step S107, the number of drawing function information tables, that is, the number of entries is determined. If the number of drawing function information tables is greater than a predetermined threshold Th, the drawing function information tables, that is, the entries are combined together in a loop from S108 to S117.

First, in step S108 in the loop, the value of a variable Count indicating the maximum number of image parts to be combined and a table position pointer pointing to drawing data to be determined as to whether it should be combined are set. The determination as to whether an image part should be combined is performed for the table directly following the previous determined table. Therefore, the value of Count and the table position pointer are set so as to indicate the previous value and the previous table position. However, in a first iteration of this loop, the value of Count is set to 0 and the table position pointer is set so as to point to the first drawing function information table.

In step S109, it is determined whether there is a next drawing function information table to be determined as to whether the corresponding image part should be combined. If it is determined in S109 that there is such a table, it is determined, in step S110 and further following steps, whether the image part should be combined.

First, in step S110, it is determined whether there is an overlap in terms of coordinates. If it is determined in step S110 that there is no overlap, the process goes to step S116 and the value of count indicating the total number of combined image parts to 0. Then in step S117, the table position pointer is incremented. Note that if ImageInfo includes information in addition to coordinates, the determination in step S110 described above is performed also using that information.

If it takes a long time to examine ImageInfo, it may be determined whether there is an overlap in terms of coordinates, by checking whether or not the associated HistogramInfo is the same using the result obtained in step S103. This allows a reduction in the time required for the determination.

If it is determined in step 110 that there is an overlap in terms of coordinates, the process goes to step Sill to further determine whether a large unnecessary area will be included in a resultant rectangle obtained by combining the entries. In the present embodiment, because coordinates are managed using rectangles, if an image part represented by a rectangle having coordinates, for example, (0, 0)–(100, 2), which is longer in a horizontal direction and an image part represented by a rectangle having coordinates, for example, (0, 0)–(2, 100), which is longer in a vertical direction are combined together, then a resultant combined rectangle (0, 0)–(100, 100) includes a large unnecessary area.

In view of the above, the area of the rectangle obtained after the combining is compared with the sum of the areas of the individual two original image parts combined together, and if the difference is greater than a predetermined threshold, combining is not performed. In this case, the process jumps to step S116.

On the other hand, if it is determined in step S111 that no large unnecessary area is included in the resultant rectangle, the process goes to step S112 to combine the two entries. The coordinates of the image function information are changed so as to indicate the coordinates of the resultant rectangle obtained by combining the two rectangles, and one entry of the table is deleted. Furthermore, the following indexes are all decremented by one.

In step S113, Count indicating the total number of combined entries is incremented by one. If it is determined in next step S114 that Count has reached the maximum allowable value Max, no more image parts are combined, and thus the process jumps to step S116.

On the other hand, if it is determined in step S114 that Count is smaller than Max, the process goes to step S115 in which the table position pointer is set so as to point to the resultant data obtained by the combining, thereby allowing the next data is to be examined in the next iteration starting from step S109.

Figure 10A:
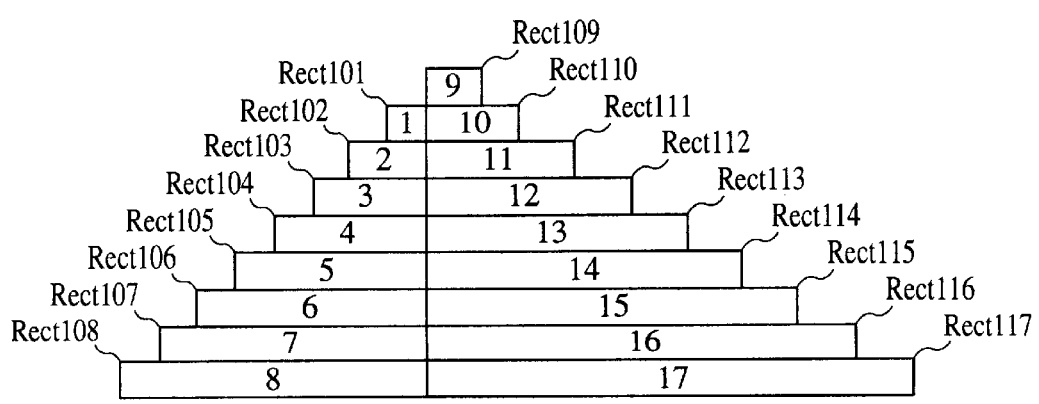
FIG. 10 is a diagram illustrating a manner of combining rectangle information.
Figure 10B:
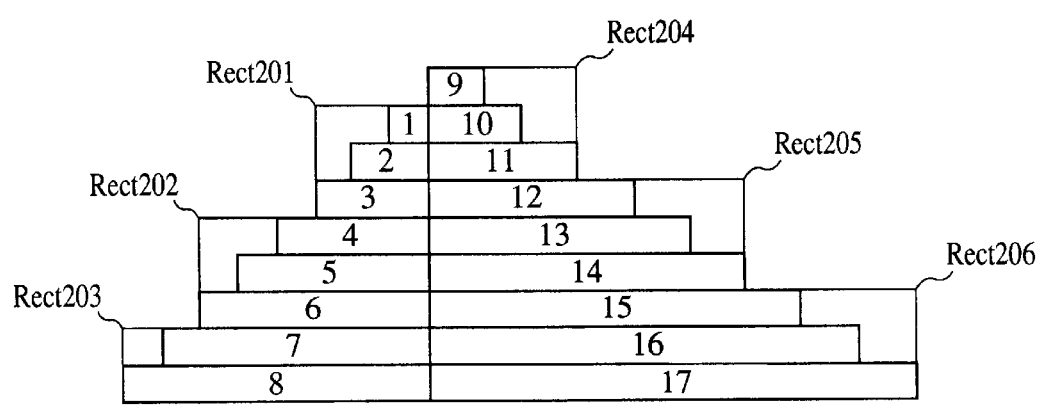

FIGS. 10A and 10B illustrate an example of a manner of combining rectangles. In FIG. 10A, image parts are numbered in the order in which the original image is divided and output, and they have corresponding rectangle information Rect101, Rect102, . . . , Rexct117. In FIG. 10B, the value of Max indicating the maximum allowable number of combined rectangles is set to three, and thus three image parts 1 to 3 are combined into a rectangle Rect201, and three image parts 4 to 6 are combined into a rectangle Rect202. However, image parts 7 and 8 have no overlap with an image part 9, and thus the image part 9 is not combined with the image parts 7 and 8 but only the two image parts 7 and 9 are combined together into a rectangle Rect203. Although in this specific example, the value of Max is set to three, the value of Max may be set to be greater than three. In this case, the number of tables decreases.

If it is determined in step S109 that the determination as to whether to perform combining is completed for all tables, the process goes to step S118 to determine whether all print data has been processed. If all data has not been processed, the process returns to step S101.

In the case where it is determined in step S118 that all data has been processed, the process goes to step S119 to again group HistogramInfo.

In most cases, step S103 can correctly detect image parts originating from the same image by checking overlapping. However, some image part can have no overlap with an immediately previous output image part originating from the same image, as is the case with the image part 9 in FIGS. 10A and 10B, which has no overlap with the image parts 1 to 8. To avoid the above problem, the re-grouping is performed in step S119.

However, because almost all image parts are determined in step S103 to be of the same original image and HistogramInfo points to the same table, it is allowed to check only data having different HistogramInfo to determine whether the image part originates from the same image. If the image part is found to originate from the same image, each associated HistogramInfo is combined together into a single piece of HistogramInfo, and all HistogramInfo, which are included in the table and which are the same as either one of the two HistogramInfo combined together, are replaced with the resultant HistogramInfo created by the combining.

In the process in step S119, the number of combined HistogramInfo is subtracted from the number of HistogramInfo created in step S104, and if the number of HistogramInfo becomes equal to one, it is determined that the re-grouping is completed, without checking the overlapping for all image parts. Therefore, in the case where there is only one original image, the re-grouping can be completed without having to check the overlapping for all image parts.

Subsequently, in step S120, correction parameters to be used in the image correction process are calculated from the intensity histogram in the grouped HistogramInfo and the calculated result is described in HistogramInfo associated with the corresponding entry.

When there is a possibility that the resultant histogram indicates that no correction is needed, the determination as to whether a correction is needed may also be performed in step S120 and data representing the determination result may be stored in HistogramInfo.

After completion of the first routine of processing the print data described above, the printer driver sends to the OS or the application a second-time request for transmission of the print data.

In the first routine described above, HistogramInfo associated with the same original image is combined together in steps S102 to S106, and thus a reduction is achieved in the number of HistogramInfo to be subjected to the grouping process in step S119. This allows the grouping process to be performed in a shorter time. Furthermore, the reduction in the number of histograms generated in steps S102 to S106 results in a reduction in the required memory capacity.

When the number of entries becomes greater than the predetermined threshold during steps S107 to S116, the number of entries is reduced to prevent the number of entries from becoming too great. The number of entries combined together is also controlled such that it does not exceed the predetermined threshold so as to minimize the unnecessary area included in the resultant rectangular area created by the combining, thereby preventing the problem described above with reference to FIG. 6 from occurring in the present embodiment in which coordinates are managed using rectangular areas.

In the present embodiment, as described above, reductions in the processing time required to create the tables and the required memory capacity are achieved.

With reference to FIG. 3, the second routine of processing the print data is described below. In step S201, as in the first routine, the print data (drawing commands) is received one by one from the application or the OS.

In the next step S202, it is determined, in a similar manner as in step S102, whether a correction is to be made upon the received image data. Because there is a possibility that some image data was determined, in step S120, as needing no correction, the determination in step S202 is performed by checking whether drawing function information is contained in one of the tables generated in step S106 and by further checking whether the correction flag in HistogramInfo generated in step S120 indicates that a correction is needed. In some cases, drawing function information tables are combined together in step S112. Therefore, for combined drawing function information tables, the determination is performed by checking whether coordinates of an image to be processed are included.

In the case where it is determined in step S202 that the received image data is not to be subjected to a correction, the process goes to step S204 and rasterizes the image data into the page memory. On the other hand, if it is determined in step S202 that the image data is to be subjected to a correction, the process goes to step S203 to make a correction upon the object image to be drawn, using the correction parameters described in HistogramInfo. After that, in step S204, the image data is rasterized into the page memory.

In step S205, it is determined whether the process is completed for all print data. If the process is not completed for all print data, steps S201 to S204 are repeated until the process is completed for all print data.

If it is determined in step S205 that the process is completed for all print data, the process goes to step S206 to perform a printer color process upon the print image data stored in the page memory so as to convert it into a form printable by the printer.

In the next step S207, the print image data which has been converted into the format printable by the printer is further converted into printer data acceptable by the printer and transferred to the printer. More specifically, in the case of the raster printer, the data is compressed for each raster line and packed into a simple printer command, and the resultant printer command is sent to the printer.

Modifications

In the embodiment described above, the image correction (color balance correction, contrast correction, chroma saturation correction) is performed on the basis of histogram information. Note that the sampling process and the grouping process disclosed above with reference to the embodiment may also be applied to other image processing.

Furthermore, in the embodiment described above, a print request is issued twice to the application. The drawing commands obtained by issuing a first print request may be stored. In this case, the second print request becomes unnecessary.

Although in the embodiment described above, the image correction is performed by the printer driver, the image correction may also be performed by the monitor driver or a color correction application program.

Although in the embodiment described above the raster driver is employed as the printer driver, other types of printer drivers may also be employed. For example, a printer driver capable of dealing with a page description language such as PostScript may be employed.

The present invention may be applied to either a system including a plurality of devices (host computer, interface device, reader, printer) or a single device (copying machine, facsimile machine). It may be allowed to specify whether or not an image correction is to be performed, via a user interface of the printer driver.

The functions of the present invention described above with reference to specific embodiments may also be achieved by supplying a software program code to a computer connected to various devices thereby operating the various devices under the control of the computer (CPU or MPU) or the system in accordance with the program code so that the above functions are achieved. It should be understood that such a computer or a computer system falls within the scope of the present invention.

In this case, the program code of the above software implements the functions of the embodiments described above with reference to FIGS. 2 and 3, and thus the program code and also means such as a storage medium for supplying such a program code to a computer fall within the scope of present invention.

Specific examples of such a storage medium for storing the program code include a floppy disk, a hard disk, an optical disk, a magneto-optical disk, a CD-ROM, a magnetic tape, a non-volatile memory card, and a ROM.

In the case where the functions of any embodiment described above are realized by executing the program code on a computer which operates under the control of an OS (operating system) or in the case where the functions of any embodiment described above are realized by executing the program code in cooperation with another application software, the program code also falls within the scope of the invention.

The invention also includes within its scope a program code which is first stored in a memory provided on an extended board of a computer or in an extended unit connected to the computer, and all or a part of the process is performed by a CPU located on the extended board or in the extended unit in accordance with the program code.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method of processing an image including a plurality of object images, comprising the steps of detecting object images related to each other and performing image processing thereon, said method further comprising the steps of:

inputting drawing commands indicating the respective object images;

determining whether the plurality of object images are related to each other, on a basis of position information managed by rectangular areas according to the respective drawing commands;

combining position information managed by the rectangular areas of object images which have been determined, in said determining step, as being related to each other, thereby generating object image management information; and setting an image processing condition in accordance with the object image management information, wherein said combining step is controlled such that a rectangular area associated with position information created as a result of the combining does not include a large unnecessary area.

2. A method of processing an image, according to claim 1, wherein the object image management information includes information based on histogram information, and the image processing condition is set in accordance with the information based on the histogram information.

3. A method of processing an image, according to claim 1, wherein said combining step is controlled such that the number of object images which are combined together does not exceed a predetermined maximum value.

4. A method of processing an image, according to claim 1, wherein said combining step is controlled such that a size of an area, which is included in a rectangular area created as a result of combining of object images and which is different from any original rectangular area indicated by drawing commands associated with the individual object images combined together, does not exceed a predetermined threshold.

5. An apparatus for processing an image including a plurality of object images, and detecting object images related to each other and performing image processing thereon, said apparatus comprising:

input means for inputting drawing commands indicating the respective object images;

determining means for determining whether the plurality of object images are related to each other, on a basis of position information managed by rectangular areas according to the respective drawing commands;

generating means for combining position information managed by the rectangular areas of object images which have been determined, by said determining means, as being related to each other, thereby generating object image management information; and setting means for setting an image processing condition in accordance with the object image management information, wherein said combining step is controlled such that a rectangular area associated with position information created as a result of the combining does not include a large unnecessary area.

6. A storage medium including a computer-readable program stored thereon, said program implementing a method of processing an image including a plurality of object images, comprising the steps of detecting object images related to each other and performing image processing thereon, said method further comprising the steps of:

inputting drawing commands indicating the respective object images;

determining whether the plurality of object images are related to each other, on a basis of position information managed by rectangular areas according to the respective drawing commands;

combining position information managed by the rectangular areas of object images which have been determined, in said determining step, as being related to each other, thereby generating object image management information; and setting an image processing condition in accordance with the object image management information, wherein said combining step is controlled such that a rectangular area associated with position information created as a result of the combining does not include a large unnecessary area.

* * * * *